Jan. 10, 1950 W. J. STOLZE 2,494,457
CENTERING CIRCUIT FOR TELEVISION RECEIVERS
Filed Aug. 28, 1947
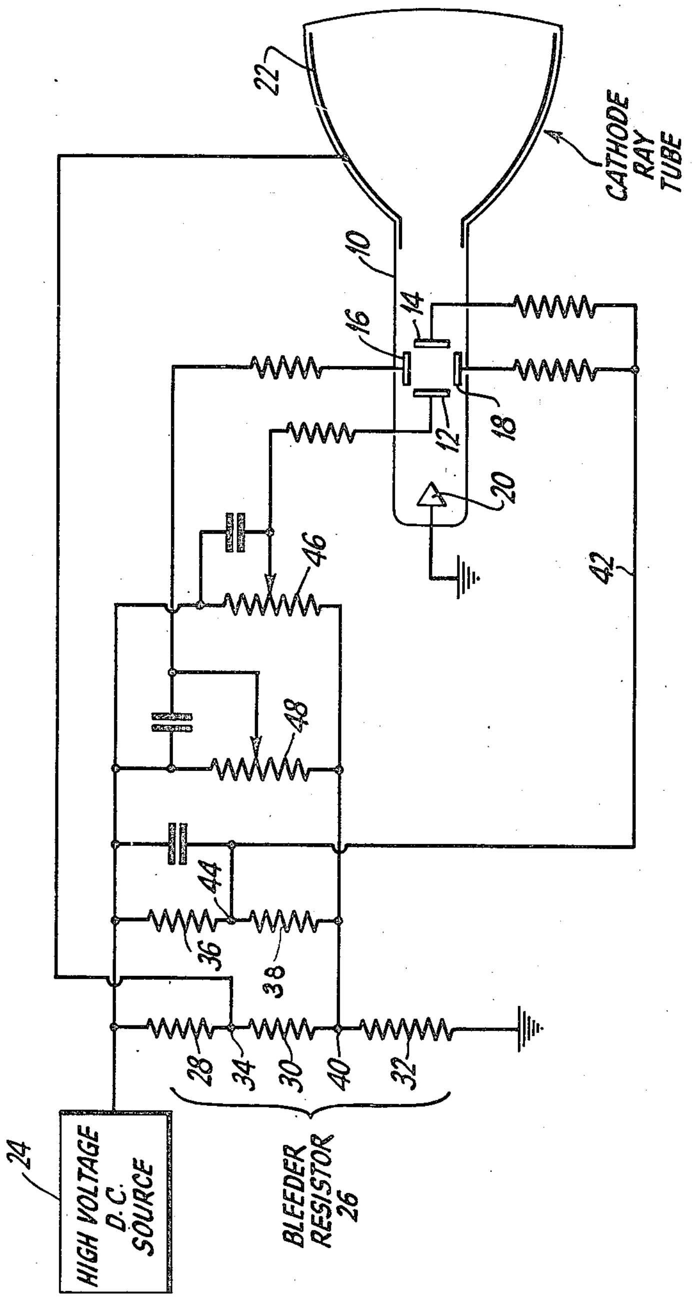
INVENTOR.
WILLIAM J. STOLZE
BY Samuel B. Smith
ATTORNEY Patented Jan. 10, 1950 2,494,457

UNITED STATES PATENT OFFICE 2,494,457

CENTERING CIRCUIT FOR TELEVISION RECEIVERS

William J. Stolze, Astoria, N. Y., assignor to Radio Corporation of America, a corporation of Delaware Application August 28, 1947, Serial No. 770,982

3 Claims. (Cl. 315—31)

The present invention relates to television systems, and more particularly relates to a circuit wherein changes may take place in the value of the potential applied to the second anode of a cathode ray tube with means for preventing such potential changes from causing a change in the position of the image raster which is produced on the face of the cathode ray tube by the periodic deflections of the cathode ray scanning beam developed therein.

In television receiving circuits employing an image-reproducing tube, or kinescope, in which the cathode ray scanning beam is deflected electrostatically, it is customary to employ an arrangement in which each pair of deflecting plates is provided with deflecting potentials which are balanced to ground. Furthermore, in order to prevent a defocusing of the cathode ray beam as it passes between each pair of deflecting plates, it is customary to maintain these plates normally at or near the relatively constant second anode potential of the tube. In such an arrangement, centering of the image raster is brought about by varying the constant potential on one plate of each pair relative to the constant potential on the other plate of that pair. To accomplish this, the usual centering circuit makes use of a so-called bleeder resistor connected between ground and the output of a high-voltage direct current source. It has been the conventional practice to connect to a common point on this bleeder resistor not only one deflecting plate of each pair, but also the second anode of the cathode ray tube. Centering of the image raster is then obtained by changing the potential on the remaining deflecting plates by means of individual potentiometers.

When a system such as the above is employed, it will be seen that any change in the overall brightness of the reproduced image will result in a corresponding change in the amount of beam current which flows through that portion of the bleeder resistor connected between the second anode of the cathode ray tube and the high-voltage direct current source. This, of course, changes the voltage drop across such resistor portion. Since, as previously stated, it is customary to connect one deflection plate of each pair to the same point on the bleeder resistor to which the tube second anode is connected, any such variations in beam current due to brightness changes will cause corresponding variations in the centering potentials on these deflection plates. The resulting change in relative voltage between the two deflection plates of each pair causes a diagonal movement, or shifting, of the image raster on the face of the cathode ray tube. Needless to say, such a shifting in the position of the image raster area is definitely objectionable to an observer, especially when brightness variations in the reproduced image are numerous.

In accordance with one feature of the present invention, an electrostatically deflected cathode ray tube is supplied with centering potentials from a high-voltage direct current source in such a manner that changes in the anode current of the tube produce no appreciable changes in the centering voltage or the differential potential present between deflection plate pairs, and hence no appreciable change in the position of the image raster area. This is accomplished, in one embodiment of the invention, by supplying the deflection plates with a centering potential from a point in the output of the high-voltage D. C. source that is different from that to which the second anode of the cathode ray tube is supplied. The tube anode current accordingly does not flow through that portion of the bleeder resistor to which the deflection plates are connected, and, as a result, changes in the tube anode current do not change the centering potential on the deflection plates. The position of the image raster, therefore, remains substantially unchanged while the brightness of the reproduced image varies.

One object of the present invention, therefore, is to provide an improved form of television centering circuit.

Another object of the present invention is to provide a television centering circuit for electrostatically deflected cathode ray tubes in which the position of the image raster on the face of the cathode ray tube is maintained substantially unchanged regardless of variations in the potential of the second anode of the image tube due to variations in the overall brightness of the reproduced image.

A further object of the present invention is to provide a television centering circuit for electrostatically deflected cathode ray tubes in which the centering potentials for the deflection plates, on one hand, and the high voltage for the tube second anode, on the other hand, are supplied from different points in the output circuit of a high-voltage direct current source.

Other objects and advantages will be apparent from the following description of a preferred form of the invention and from the drawing, the single figure of which is a circuit diagram of a preferred embodiment of the present invention.

Referring now to the drawing, there is shown a portion of a television receiving circuit which includes an image-reproducing cathode ray tube 10. Tube 10 is of the electrostatically deflected type, and includes a pair of horizontal deflecting plates 12, 14 and a pair of vertical deflecting plates 16, 18. Tube 10 also includes, in the usual manner, an electron gun assembly, schematically represented at 20 in the drawing, and a second anode, or accelerating electrode, 22, which may comprise a conductive coating on the inner surface of the cathode ray tube.

Also shown in the drawing is a high-voltage direct current source 24 of any suitable type which may, for example, include a R.-F. oscillator and rectifier, together with one or more voltage multiplying stages, if necessary, to produce an output voltage suitable for application to the second anode 22 of tube 10.

A bleeder resistor 26 is connected between the output of the high-voltage direct current source 24 and ground. Resistor 26 includes at least three separate portions 28, 30 and 32, as shown. The second anode 22 of tube 10 is connected to a point 34 between the resistor portions 28 and 30, so that the beam current of the cathode ray tube 10 flows only through the portion 28 of the entire bleeder resistor 26.

The cathode ray beam centering circuit for tube 10 includes a further pair of series-connected resistors 36 and 38 which are connected in parallel with the portions 28 and 30 of the bleeder resistor 26. In other words, one end of resistor 36 is joined directly to the output of the high-voltage source 24, and one end of the resistor 38 is connected to a point 40 between the portions 30 and 32 of the bleeder resistor 26. One horizontal deflection plate 14 and one vertical deflection plate 18 are connected over a common conductor 42 to a point 44 between resistors 36 and 38. Isolating resistances are connected between each of plates 14 and 18 and the common conductor 42 in order that the beam deflection potentials from a deflection generator (not shown) may be applied to the plates, the deflection potential being superimposed upon the static or average potential of the deflection plates.

Two centering potentiometers 46 and 48 are connected in parallel with each other and also in parallel with the series-connected resistors 36 and 38, as shown in the drawing. The movable arm on potentiometer 46 is connected (through an isolating resistance) to the remaining horizontal deflection plate 12 of tube 10, while the movable arm of potentiometer 48 is connected (through an isolating resistance) to the remaining vertical deflection plate 16. By a selective variation of the potentiometers 46 and 48, therefore, the voltage on plates 12 and 16, respectively, may be altered relative to the normally constant voltage on the plates 14 and 18, thus effecting a centering of the undeflected cathode ray beam on the face of tube 10 (i. e. a horizontal and vertical position control of the scanned raster on the screen of tube 10).

It will now be appreciated that the voltage at point 44 between the resistors 36 and 38 will not change to any noticeable extent when the current through resistor portion 28 varies (in response to brightness changes in the reproduced image) thereby producing a change in the voltage drop across resistor 28 and hence the potential at point 34. The only significant factor affecting the voltage at point 44 will be the output of the high-voltage D. C. source 24, and, with a properly regulated power supply, such changes need not be of a material nature. Hence, the centering potentials as applied to the plates 12, 14, 16, 18, will depend only upon the selected adjustment of the potentiometers 46 and 48, and the average differential potential of the pairs of deflecting plates will not be altered as a function of the current intensity of the beam.

While the invention has been described in connection with cathode ray beam centering apparatus as employed in television systems, it will be obvious that it is also adapted for use in other cathode ray beam applications, such, for example, as in the oscillographic field.

Having now described the invention, what is claimed is:

1. Apparatus for stabilizing the cathode ray beam centering potentials in a cathode ray tube of the electrostatic type, said apparatus including a source of high voltage of relatively constant value, a first resistor connected between the output of said high voltage source and ground, a connection between one anode of said cathode ray tube and a point on said first resistor, three additional resistors each connected in parallel relationship with at least a portion of said first resistor, connections between one deflecting plate of each pair and a point on one of the said additional resistors, and connections between the remaining deflecting plates, respectively, and points on the remaining additional resistors.

2. Apparatus in accordance with claim 1, in which the said remaining additional resistors comprise potentiometers and adjustable elements of which are respectively connected to the said remaining deflecting plates.

3. In a television centering arrangement for electrostatically-deflected cathode ray tubes of the type in which the two pairs of electrostatic deflecting plates are maintained substantially at or near the tube second anode potential, the improvement which comprises apparatus for preventing the image raster produced on the luminescent screen of said tube from shifting its position in response to changes in the overall brightness of the reproduced image, said apparatus including a source of relatively constant high voltage, a first circuit including a bleeder resistor for supplying high voltage from said source to one anode of said cathode ray tube, and an additional circuit for supplying high voltage from said source to the said deflecting plates, said additional circuit includes three further resistors each connected in parallel relationship with at least a portion of said bleeder resistor, one deflecting plate of each pair being connected to a point on one of the said three further resistors, and the remaining deflecting plates being connected respectively to points on the two remaining further resistors, whereby a change in the voltage drop across that portion of said bleeder resistor to which the said cathode ray tube second anode is connected in response to changes in the overall brightness of the reproduced image will cause no appreciable voltage drop across any of the said three further resistors.

WILLIAM J. STOLZE.

REFERENCES CITED

The following references are of record in the file of this patent:

UNITED STATES PATENTS

| Number | Name | Date |
|---|---|---|
| 2,426,439 | Dome | Aug. 26, 1947 |